United States Patent [19]
Mortimer et al.

[11] Patent Number: 4,813,338
[45] Date of Patent: Mar. 21, 1989

[54] PNEUMATICALLY OPERATED SERVO-BOOSTER

[75] Inventors: Ivan Mortimer, West Midlands; Glyn P. R. Farr, Warwick, both of England

[73] Assignee: Lucas Industries, Birmingham, England

[21] Appl. No.: 85,897

[22] Filed: Aug. 17, 1987

[30] Foreign Application Priority Data

Aug. 21, 1986 [GB] United Kingdom ............... 8620355

[51] Int. Cl.$^4$ .............................................. F15B 9/10
[52] U.S. Cl. .................................. 91/369.2; 91/376 R
[58] Field of Search ............. 91/369 R, 369 A, 369 B, 91/376 R, 377, 384, 387

[56] References Cited

U.S. PATENT DOCUMENTS

| | | | |
|---|---|---|---|
| 3,209,657 | 10/1965 | Randol | 91/369 B |
| 3,727,405 | 4/1973 | Randol | 91/369 B X |
| 3,795,426 | 3/1974 | Sisson | 91/376 R X |

FOREIGN PATENT DOCUMENTS 1430633  9/1969  Fed. Rep. of Germany .... 91/369 B

Primary Examiner—Robert E. Garrett
Assistant Examiner—Mark A. Williamson
Attorney, Agent, or Firm—Staas & Halsey

[57] ABSTRACT

A pneumatically operated servo booster has a housing divided by a diaphragm assembly into front and rear chambers respectively. A hub movable with the partition carries a vacuum valve seat and a plunger slidable within the hub carries an atmospheric valve seat, the seats co-operating with a spring-urged poppet valve to control fluid flow to the chamber. A stack of Belleville washers normally transmits input force from an input rod, the washers yielding at a predetermined input force to allow a cup member to engage an abutment carried by the hub, causing the hub to move relative to the valve member and temporarily open the valve seat to cause a reduction in boost compensating for the excess input force.

10 Claims, 2 Drawing Sheets

PNEUMATICALLY OPERATED SERVO-BOOSTER

BACKGROUND OF THE INVENTION

1. Field of the Invention

This invention relates to a pneumatically operated servo-booster, primarily for use in vehicle hydraulic braking systems for the purpose of providing power assistance in the actuation of a brake master cylinder.

2. Description of the Related Art

The use of conventional servo-boosters when operated by a very strong over-zealous driver can result in the application to the associated braking system of actuating pressures which are far in excess of that required for optimum operation of the system at peak performance. Since the brake system components must be designed to withstand the maximum pressure likely to be encountered in service, potential cost savings can be envisaged in a system in which the maximum operating pressure is limited so as to be closer to the required optimum value, especially when the system includes anti-lock equipment in which fluid is pumped back to the master cylinder, since the pump motor energy requirements for such a system are proportional to the maximum master cylinder pressure.

SUMMARY OF THE INVENTION

An object of the invention is to provide a pneumatically operated servo booster in which the boost is reduced during the application of abnormally high pedal efforts.

According to the present invention, a pneumatically operated servo-booster comprises a housing divided into two chambers by a movable partition, a hub member movable with the partition and providing a first valve seat for co-operation with a valve member, a valve element movable relative to the hub member under the action of a force input member and providing a second valve seat for co-operation with the valve member, said co-opertion between the valve seats and valve member occurring in dependence upon the relative axial positions of the two seats so as to control the balance of pressure in the two chambers, and yieldable force-transmission means acting, when in non-yielding condition to transmit actuating force to the force input member to cause the latter to place the first and second valve seats in a first operative condition permitting a servo-inducing pressure differential to be created at the respective sides of the partition, the transmission means yielding when the input force reaches a predetermined value, permitting engagement of surfaces so as to cause the input force to move the hub member relative to the input member and valve element, thereby causing the valve seats to assume a second operative condition in which said pressure differential and consequently the servo effect applied by the booster are reduced.

Preferably, the arrangement is such that the servo effect is reduced by substantially the amount of the excess input force so that the output effort to the braking system remains substantially constant over a range of operation during which the input force remains at or above said predetermined value.

In one convenient arrangement, the force input member has a first portion engaged with the valve member and a second portion adapted for connection to force applying means, said yieldable means acting between said portions in such a manner that, in its non-yielding condition, it transmits force from said second portion to the first portion of the force input means, said second portion being normally movable relative to the hub member but engaging the latter upon yielding of the yieldable means, causing the hub member to move relative to said second portion of the force input member and valve member in a direction such as to cause disengagement of said first valve seat from said valve member in said second operative condition of the valve seats.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
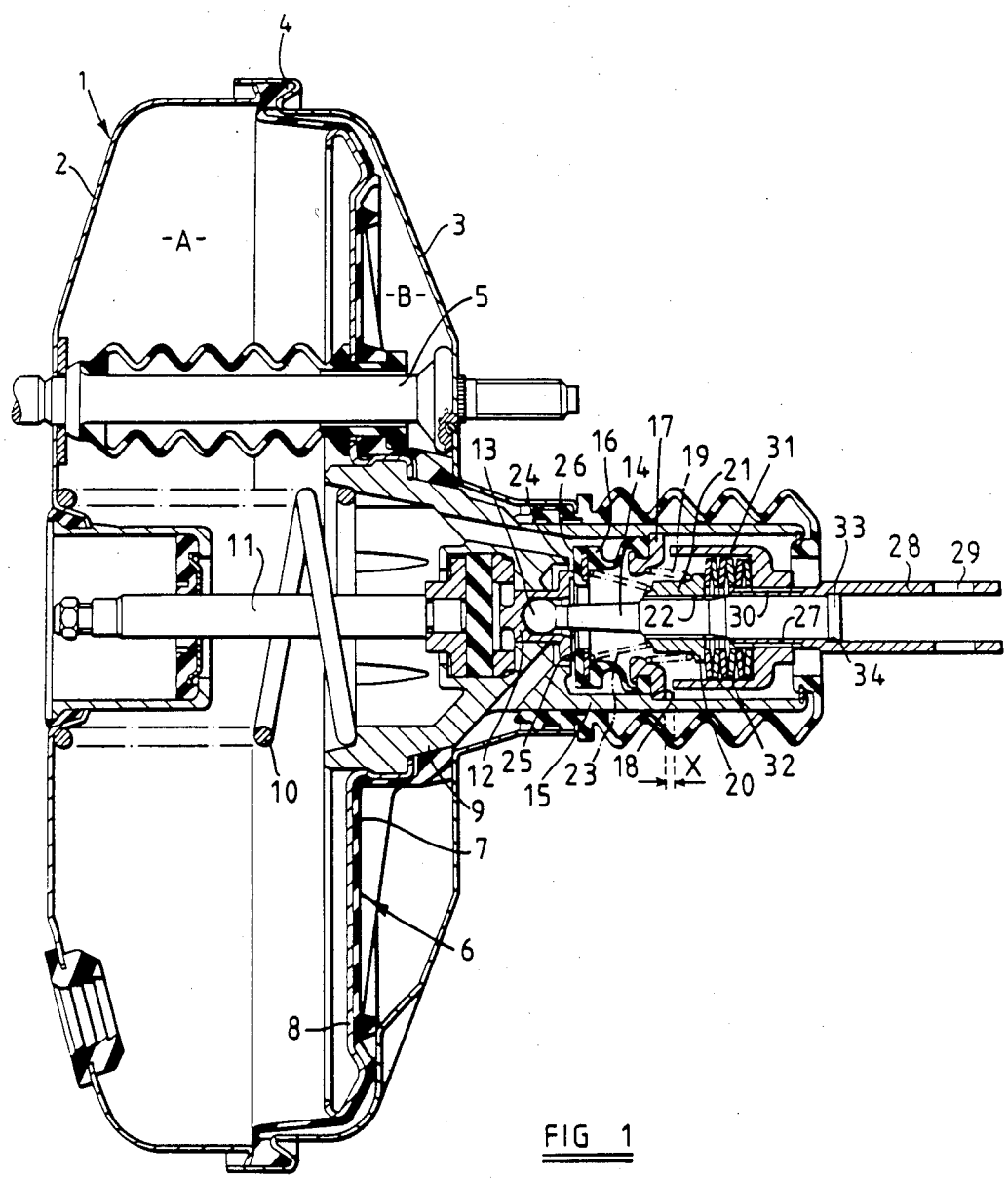
FIG. 1 is a longitudinal cross-section of one form of the servo-booster assembly of the invention.

The servo-booster illustrated in FIG. 1 of the drawings has a housing 1 composed of front and rear shells 2, 3 which are joined around their outer peripheries at joint 4 The shells are reinforced by a number of ties 5 extending between the shells 2, 3, the ties also serving to mount the housing on a master cylinder flange and/or vehicle bulkhead (not shown), in conventional manner.

The interior of the housing is divided into two chambers A, B by diaphragm assembly 6 which includes a flexible diaphragm 7 and a relatively rigid diaphragm support plate 8, the diaphragm 7 being trapped around its outer periphery at the joint 4 between the housing shells 2 and 3. The backing plate 8 is secured to a central hub 9 which is urged to the right, as seen in the drawing, by a coil spring 10 acting between the boss and an internal surface portion of the shell 2. The hub 9 supports a force output rod 11 which would be connected, in use, to a piston of a master cylinder (not shown) forming part of a vehicle hydraulic braking system. Also housed within the hub 9 is a valve control piston 12 which is allowed limited axial sliding movement within the boss and to which is crimped or otherwise secured a ball end 13 of a force input rod 14 to which actuating forces are transmitted, from a driver-operated brake actuating pedal (not shown), in the manner to be described.

The hub 9 has a rearwardly extending hollow extension 15 within which is housed a poppet valve assembly 16 mounted on a generally annular abutment member 17 held against a shoulder 18 within the extension by a spring 19 reacting against a flange 20 of a sleeve 21 which is secured axially to the rod 14 by a threaded connection 22 between the rod and sleeve. A further spring 23 acts between the sleeve 21 and poppet valve assembly 16 to urge the assembly to the left as seen in the drawing. The hub 9 is shaped to form an annular vacuum valve seat 24 and the valve element 12 is shaped to form an atmospheric valve seat 25, both of the valve seats 24, 25 co-operating with an axially facing surface 26 of the poppet valve assembly 16 to control the flow of air to and from the rear chamber B of the housing 1.

The input rod 14 is slidably carried within a connecting sleeve 27 formed as the end portion of a fork member 28 which is apertured at 29 for connection to a driver-operated control device, such as a pedal. The outer surface of the sleeve 27 is threaded and forms a threaded connection 30 with an internal thread formed within a cup shaped member 31 surrounding the input shaft. A stack of Belleville washers 32 surrounds the input shaft within the member 31 and reacts against respective opposed surfaces of the member 31 and sleeve 21 so that the input rod 14 is urged to the left relative to the sleeve 27, bringing a head 33 of the rod 14 into abutment with a shoulder 34 formed at the junction between the fork 28 and sleeve 27. The innermost end of the cup member 31 is spaced by a distance X from the opposed surface of the abutment member 17, for the purpose to be described.

The operation of the booster will now be described with reference to the curve depicted in FIG. 2 which represents the output load of the booster plotted against the input load. Input force applied to the fork member 28 is transmitted to the input rod 14 via the cup member 31, Belleville washers 32 and sleeve 21, causing the valve member 12 to move to the left. The poppet valve 16 follows under the action of the spring 23 and engages the vacuum valve seat 24, cutting off the vacuum supplied to the rear chamber B of the housing. Further inward movement of the valve member 12 disengages the atmospheric valve seat 25 from the poppet valve to admit air at atmospheric pressure to the chamber B. This causes the diaphragm assembly 6 and attached boss 9 to move to the left, applying power assistance via the output rod 11 to an operative piston of a master cylinder with which the booster is associated, in use. This initial part of the operation is conventional and the output load resulting therefrom is represented by the portion (a) of the curve in FIG. 2. Maximum boost effort occurs at the junction between the portions (a) and (b) of the curve, the latter portion representing higher pedal efforts applied by the driver which, whilst producing a lower rate of increase in output load, may nevertheless result in excessive loads being applied to the master cylinder. The booster of the invention prevents the occurrence of such excessive loads during the next mode of operation which is represented by the portion (c) of the curve of FIG. 2 and which will now be described.

Figure 2:
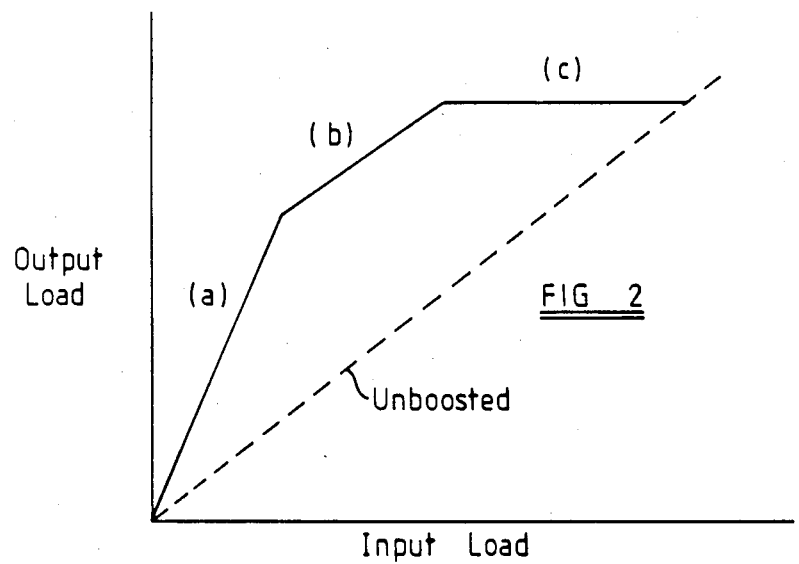
FIG. 2 is a graph plotting the output of the booster of the invention against input load.

The spacing X between the cup member 31 and abutment 17 is such that the inward movement of the input rod under normal input load conditions is sufficient to operate the valve seats 24, 25 in the aforesaid conventional manner to produce the portion (a) of the curve of FIG. 2. Once the maximum boost has been achieved, increasing pedal effort will result in an output load which increases along the part (b) of the curve, the vacuum valve seat 24 remaining closed and the atmospheric valve seat 25 remaining open during this phase of operation. The pre-loading of the stack of Belleville washers 32 is chosen such that the washers yield at a load which is represented by a point at a convenient location along part (b) of the curve, the resulting compression of the washers enabling the cup member 31 to engage the abutment member 17.

Once this has occurred, input forces are transmitted directly to the hub 9, which now commences to move to the left relative to the rod 14, as permitted by relative sliding movement between the rod and surrounding sleeve 30. The effect of this is to move the vacuum valve seat 24 away from the poppet valve 16, the latter moving under the action of spring 23 to re-engage the atmospheric valve seat 25 on the valve member held immobile due to the reactionary force of the master cylinder pressure on the output rod 11. Air escapes from the rear chamber B of the booster past the open valve seat 24 reducing the pressure in chamber B and thus the force acting on the diaphragm assembly 6. This allows the hub 9 to move to the right by a distance sufficient to re-close the valve seat 24, preventing further pressure loss from the chamber B. This represents the commencement of the part (c) of the curve of FIG. 2, the assisting force produced by the booster being progressively decreased with further increases in input load in order to maintain the output substantially constant, as indicated. Ideally, this constant output load would be set at about 150 bars for the average hydraulic braking system. In the ultimate case, it is theoretically possible to apply such a large input load that the assisting force of the booster is reduced to zero, at which point the output would begin to increase along the broken line in FIG. 2 which represents the unboosted output load. Such an enormous input force would be required to achieve this condition that it is unlikely to occur in practice.

In the event that the input force is decreased from a high level, but insufficiently to permit recovery of the washers 32, the hub 9 moves to the right to some extent under the action of the spring 10, tending to move the valve member 16 in the same direction to re-admit air to the chamber B and partly restore the servo action to balance the reduction in input force. When the input force returns to a normal level the cup member is returned to the right by expansion of the Belleville washers so as to recreate the spacing X, whereupon the operation of the booster reverts to the well understood conventional mode.

Figure 3:
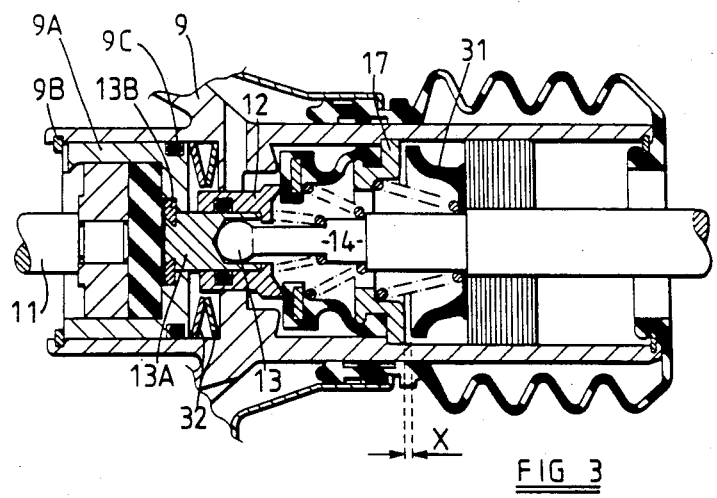
FIG. 3 is a view similar to FIG. 1 of part of an alternative embodiment of the servo-booster of the invention.

In the alternative embodiment illustrated in FIG. 3, the Belleville washers 32 are located beyond the inner end of the input rod 14, being now forwardly of the valve seats instead of rearwardly thereof, as previously. The washers act between the hub 9 and a plug 9A located within the hub and reacting against a circlip 9B. A seal 9C is provided between adjacent surfaces of the plug and hub. The cup member 31 is retained and is spaced a distance X from the abutment member 17, as before. In this embodiment, the ball end 13 of the input rod 14 is engaged within an insert 13A slidably mounted within the valve member 12, the other end of the input rod being connected rigidly to a driver-operated force input member. Axial movement of the plug 13A to the right is limited by a washer 13B secured thereto, or alternatively by an integral flange on the plug which may replace the washer.

The operation of this embodiment is similar to that described previously, the washers 32 collapsing at a predetermined high input load to permit engagement of the cup member with the abutment member 17. The hub 9 and valve member 12 are then able to move relative to the rod 14, enabling the degree of boost to be decreased in the manner described previously to maintain the output load to the master cylinder substantially constant.

Various changes may be made to the embodiments described without departing from the principle of the invention. For example, the Belleville washers 32 may be replaced by any suitable form of resilient means, such as a coil spring or combination of springs suitable to provide the required yielding effect. Alternatively, the yieldable means may be in the form of a fluid pressure-operated valve-controlled device operable in a load dependent manner to enable the booster output to be reduced in response to the occurrence of excessively high input loads.

We claim:

1. A pneumatically operated servo-booster comprising:
   a housing divided into two chambers by a movable partition;
   a first valve member;
   a hub member movable with the partition and providing a first valve seat for co-operation with the first valve member;
   a force input member axially movable within the hub member;
   a second valve member movable relative to the hub under the action of the force input member and providing a second valve seat for co-operation with the first valve member, said co-operation between the first and second valve seats an the first valve member occurring in dependence upon the relative axial positions of the first and second valve seats so as to control the balance of pressure in the two chambers; and
   yieldable force-transmission means acting, when in non-yielding condition to transmit actuating force to the force input member to cause the latter to place the first and second valve seats in a first operative condition permitting a servo-inducing pressure differential to be created at the respective sides of the partition, the transmission means yielding when the input force reaches a predetermined value, permitting engagement of surfaces so as to cause the input force to move the hub relative to the input member and the second valve member, thereby to place the first and second valve seats in a second operative condition in which said pressure differential and consequently the servo effect applied by the booster are reduced.

2. A servo-booster according to claim 1 wherein the arrangement is such that the servo effect is reduced by substantially the amount of the excess input force.

3. A servo-booster according to claim 1 wherein the force input member has a first portion engaged with the second valve member and a second portion adapted for connection to force applying means, said yieldable means acting between said portions in such a manner that, in its non-yielding condition, it transmits force from said second portion to the first portion of the force input means, said second portion being normally movable relative to the hub member but engaging the latter upon yielding of the yieldable means, causing the hub member to move relative to said second portion of the force input member and the first valve member in a direction such as to cause disengagement of said first valve seat from said first valve member in said second operative condition of the first and second valve seats.

4. A servo-booster according to claim 1 wherein said force input member has a first portion and a second portion, and the first portion is a rod slidable within a sleeve formed by said second portion, the first and second portions carrying respective abutment means between which the yieldable means acts, the abutment means carried by said second portion having an axial projection providing one of said surfaces adjacent the other of said surfaces formed on the hub member said surfaces being mutually spaced until yielding of the transmission means occurs, whereupon said surfaces engage to enable the input force to be applied to the hub member to move the latter so as to cause the first and second valve seats to assume their second operative condition.

5. A servo-booster according to claim 4 wherein the abutment means carried by said second portion has a generally cylindrical portion surrounding the force input member and constituting said axial projection, the yieldable means being housed within said cylindrical portion.

6. A servo-booster according to claim 5 wherein the yieldable means is one or more Belleville washers surrounding the force input member.

7. A servo-booster according to claim 1 wherein the first valve member and yieldable means lie to one side of said first and second valve seats.

8. A servo-booster according to claim 1 wherein the first valve member and yieldable means lie at opposite sides of said first and second valve seats.

9. A servo-booster according to claim 8 wherein the resilient means is housed within the hub member.

10. A servo-booster according to claim 8, further comprising a force output member, the force input member acting on means movable relative to said second valve member and through which input force is transmitted to the force output member.

* * * * *